United States Patent [19]

Morgan, Jr.

[11] 4,024,065

[45] May 17, 1977

[54] FILTER FOR LIQUID MATERIAL

[75] Inventor: Howard William Morgan, Jr., Michigan City, Ind.

[73] Assignee: Filter Specialists, Inc., Michigan City, Ind.

[22] Filed: Dec. 4, 1975

[21] Appl. No.: 637,737

[52] U.S. Cl. .............................. 210/315; 210/317; 210/448; 210/452; 210/453

[51] Int. Cl.² ........................................ B01D 29/04

[58] Field of Search .......... 210/315, 317, 445, 448, 210/452, 453, 455, 457, 458, 484, 489, 437, 446, 447, DIG. 10, 316; 55/529, 495, 501, 510, 337, 459 R, 505

[56] References Cited

UNITED STATES PATENTS

| | | | |
|---|---|---|---|
| 1,787,577 | 1/1931 | Hills | 210/315 |
| 2,100,951 | 11/1937 | Glass et al. | 210/484 |
| 3,147,220 | 9/1964 | Avery | 210/315 |
| 3,631,987 | 1/1972 | Cattano, Sr. | 210/452 |
| 3,640,392 | 2/1972 | Smith et al. | 210/445 |
| 3,771,664 | 11/1973 | Schrink et al. | 210/445 |

Primary Examiner—Frank W. Lutter
Assistant Examiner—David L. Lacey
Attorney, Agent, or Firm—Oltsch & Knoblock

[57] ABSTRACT

A filter including a housing spanned by a cap. A liner constituting a filtering medium is fitted into the housing with the outer surface of the liner contacting the inner surface of the housing. A wall member supports one end of the liner within the housing. Liquid is introduced into the filter housing through an inlet port where it passes through the liner and out openings formed by the wall member at one end of the liner.

6 Claims, 3 Drawing Figures

U.S. Patent    May 17, 1977    4,024,065
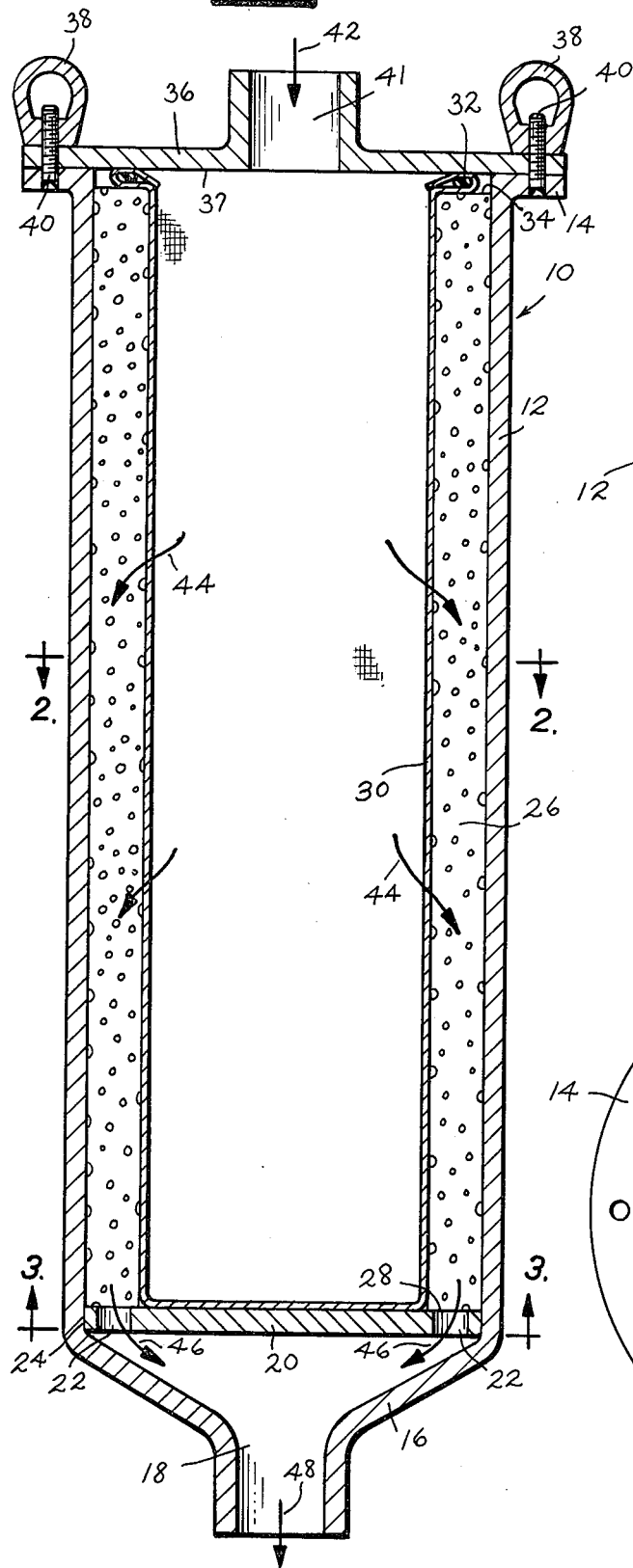
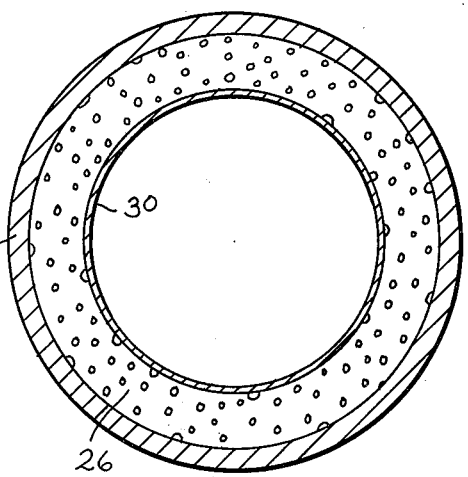
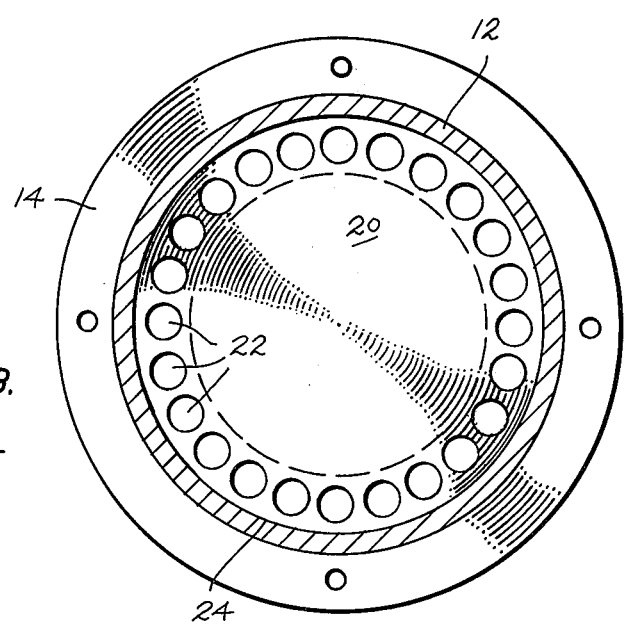

4,024,065

FILTER FOR LIQUID MATERIAL

SUMMARY OF THE INVENTION

This invention relates to a liquid filter incorporating a filtering liner.

In the filter of this invention the filter housing includes a side wall and an inlet which opens into the interior of the housing formed by the side wall. A cap spans the housing inlet. A liner is fitted into the housing with its outer face making peripheral contact with the inner face of the housing side wall. A wall member contacts one end edge of the liner and is positioned within the housing adjacent the outlet port of the filter. The wall member includes opening means which underlie the contacting end edge of the liner. Liquid enters the housing through its inlet and passes into the interior of the liner. The liquid then passes through the liner in a direction generally paralleling the housing side wall inner face to the wall member contacting end edge of the liner. There the liquid passes through the opening means in the wall member and subsequently through the outlet port of the filter.

Accordingly, it is an object of this invention to provide a filter which is for liquid material and which includes a liquid pervious filtering liner supported within the housing of the filter.

Another object of this invention is to provide a liquid filter which is of efficient operation and economical construction.

Other objects of this invention will become apparent upon a reading of the invention's description.

BRIEF DESCRIPTION OF THE DRAWINGS

FIG. 1 is a longitudinal sectional view of the illustrated filter embodiment.

FIG. 2 is a cross sectional view of the filter taken along line 2—2 of FIG. 1.

FIG. 3 is a cross sectional view of the filter taken along line 3—3 of FIG. 1.

DESCRIPTION OF THE PREFERRED EMBODIMENT

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

The filter illustrated in FIGS. 1–3 includes a housing 10 having a cylindrical side wall 12 terminating at one end in an outturned flange 14. Housing 10 includes an end wall 16 joined to side wall 12 at its opposite end. A filter outlet port 18 is formed in end wall 16. A wall member 20 extends across end wall 16 from one side to the other side of side wall 12. Wall member 20 includes a plurality of angularly spaced openings 22 located peripherally about outer edge 24 of the wall member.

A cylindrical shaped liner 26 is fitted into housing 10. The outer face of liner 26 makes peripheral contact with the inner face of housing side wall 12. One end 28 of liner 26 contacts wall member 20 and overlies openings 22 in the wall member. Liner 26 is formed of a liquid pervious or permeable filtering material and is of a generally rigid construction. The porosity and composition of liner 26 may vary with the type of liquid and the degree of filtration desired. Compacted steel wood, multiple layers of mesh screen, and open cellular foamed plastic are but a few of the variety of materials that can be utilized for liner 26.

While liner 26 may be utilized as the sole filtering medium in the filter of this invention, it is preferable that a filter bag constructed from cotton cloth or similar interwoven material is utilized in conjunction with the liner. In the illustrated embodiment, a filter bag 30 is shown fitted into the open interior of liner 26. The margin of filter bag 30 at its open end is folded over a shape-retaining ring 32. The folded margin of bag 30 and ring 32 are supported upon the opposite end 34 of liner 26. End 34 of liner 26 is spaced slightly inwardly from the edge of flange 14 of housing 10. A cap 36 spans the open end of housing 10 and is secured to the housing by a plurality of hold-down bolts 38 turned upon threaded studs 40 carried peripherally about flange 14. The inner face 37 of cap 36 contacts bag 30 at its open end and causes the folded bag margin and ring 32 to be slightly compressed between liner end 34 and the cap.

The filter of this invention also includes an inlet port 41 which in the illustrated embodiment is shown formed in cap 36. During operation of the filter, liquid, as indicated by arrow 42, enters inlet port 41 and flows into the interior of filter bag 30. The liquid then passes laterally outwardly through the filter bag and into liner 26, as indicated by arrows 44. After entering liner 26 the liquid flows lengthwise through the liner, paralleling side wall 12 of the housing, and exits at liner end 28. The now filtered liquid passes from liner end 28, through openings 22 in wall member 20, as illustrated by arrows 46, out outlet port 18, as indicated by arrow 48. Wall member 20, except for openings 22, is of a liquid impervious construction which causes substantially all the liquid passing through the filter to be directed lengthwise through liner 26.

When either filter bag 30 or liner 26 becomes permeated with filter residue, hold-down bolts 38 are removed from studs 40 and cap 36 removed from housing 10. Filter bag 30 and liner 26, if necessary, are then pulled from filter housing 10 and a new liner and bag, as the case may be, replaced. Cap 36 is then repositioned over the opening into housing 10 and bolts 38 turned back upon studs 40 to resecure the cap to the housing. In fitting liner 26 within housing 10 it is important that the outer surface of the liner annularly contact the inner surface of housing side wall 12 so as to prevent any appreciable amount of liquid from passing between the liner and the side wall during the filtering operation without having to follow a tortuous path lengthwise through the liner.

It is to be understood that the invention is not to be limited to the details above given, but may be modified within the scope of the appended claims.

What I claim is:

1. A liquid filter comprising in combination a housing and cap, said housing having an open end and including a continuous side wall and an end wall located oppositely from said open end, said cap connected to said housing open end, said combination housing and cap including an inlet port means for receiving a liquid and an outlet port means for discharging said liquid, a wall member fitting transversely within said housing and located between said inlet and outlet port means, said housing side wall having an inner face, said wall member having openings therein peripherally located about said wall member adjacent said side wall inner face, said wall member sealing said inlet port means from said outlet port means except at its said peripheral openings, a liner including first and second end edges and inner and outer side faces defining an interior opening, said liner fitted into said housing between said inlet port means and said wall member, said liner formed of a liquid pervious filtering material, said liner outer face contacting said side wall inner face with said first end edge of the liner positioned against said wall member and overlying said peripheral openings thereof, said inlet port means in communication with the interior opening of said liner whereby liquid will pass from said inlet port means into said liner interior opening and through said liner inner face and thereafter lengthwise of the liner toward said liner first end edge and through said wall member at the peripheral openings thereof and out said outlet port means.

2. The liquid filter of claim 1 and including a filter bag having an opening defined by a marginal edge, said bag fitted within said liner interior opening and having its opening defining marginal edge located adjacent said inlet port means.

3. The filter of claim 2 wherein said bag marginal edge is supported upon said liner second end edge, said cap including said inlet port means and making peripheral engagement with said bag marginal edge.

4. The liquid filter of claim 1 wherein said outlet port means is in said end wall, said wall member spanning said end wall.

5. The liquid filter of claim 4 wherein said wall member has a peripheral edge and said opening means therein constitutes a plurality of openings extending through said wall member and spaced about said peripheral edge.

6. The liquid filter of claim 1 wherein said side wall of the housing is cylindrical, said liner being cylindrical and fitting complementally against the inner face of said side wall.

* * * * *